US012093703B2

(12) United States Patent
Nouri et al.

(10) Patent No.: US 12,093,703 B2
(45) Date of Patent: Sep. 17, 2024

(54) COMPUTER-GENERATED MACROS AND VOICE INVOCATION TECHNIQUES

(71) Applicant: Microsoft Technology Licensing, LLC, Redmond, WA (US)

(72) Inventors: Elnaz Nouri, Seattle, WA (US); Carlos Toxtli Hernandez, Morgantown, WV (US); Ryen W. White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 17/197,802

(22) Filed: Mar. 10, 2021

(65) Prior Publication Data
US 2022/0291932 A1    Sep. 15, 2022

(51) Int. Cl.
*G06F 9/451*   (2018.01)
*G06F 3/16*    (2006.01)

(52) U.S. Cl.
CPC .............. *G06F 9/451* (2018.02); *G06F 3/167* (2013.01)

(58) Field of Classification Search
CPC ........ G06F 8/73; G06F 9/45512; G06F 30/27; G06F 3/167; G06F 9/451; G06N 20/00
See application file for complete search history.

(56) References Cited

U.S. PATENT DOCUMENTS

| 6,802,052 | B1 * | 10/2004 | Andrews ................. G06F 3/023 |
|||||717/106|
| 2002/0120746 | A1 * | 8/2002 | Patil ..................... H04Q 3/0054 |
|||||709/227|
| 2002/0122076 | A1 * | 9/2002 | Nakaki ................. G06F 3/0481 |
|||||715/847|
| 2006/0053126 | A1 * | 3/2006 | Baca ..................... A61B 8/4281 |
| 2009/0144625 | A1 * | 6/2009 | Muller ................... G06F 9/451 |
|||||715/723|
| 2009/0183124 | A1 * | 7/2009 | Sridhar .................. G06F 3/048 |
|||||715/847|

(Continued)

OTHER PUBLICATIONS

Melman, Howard, "QUICKSILVER User Manual" Version 0.15, published on Jan. 10, 2009, retrieved from https://qsapp.com/docs/Quickslver.pdf of Jul. 6, 2023 (127 pages, specifically pp. 34-41). (Year: 2009).*

(Continued)

*Primary Examiner* — Eric J. Bycer

(57) ABSTRACT

In examples, a set of actions performed by a user is identified as an action sequence. If user performance of the same action sequence or similar action sequences exceeds a predetermined threshold, a recommendation to create a macro may be generated. The macro may have one or more associated triggers, such that it may be invoked using voice input or via a user interface, among other examples. A macro may have an associated context in which it applies. In some instances, a trigger used to invoke the macro comprises an indication as to such a context. For example, the macro may be invoked in the context of a document, such that one or more document parts are processed accordingly. As another example, the macro may be invoked to process multiple documents, as may be related in subject matter or associated with the same application.

20 Claims, 11 Drawing Sheets

(56) References Cited

U.S. PATENT DOCUMENTS

| | | | | |
|---|---|---|---|---|
| 2011/0040824 | A1* | 2/2011 | Harm | G06F 9/45529 |
| | | | | 726/4 |
| 2012/0079395 | A1* | 3/2012 | Bengualid | G06F 40/20 |
| | | | | 715/745 |
| 2013/0254139 | A1* | 9/2013 | Lei | G06N 5/02 |
| | | | | 706/11 |
| 2014/0075303 | A1* | 3/2014 | Wong | G06F 3/048 |
| | | | | 715/704 |
| 2014/0136940 | A1* | 5/2014 | Breslau | G06F 40/177 |
| | | | | 715/227 |
| 2016/0188169 | A1* | 6/2016 | Wang | G06F 3/04842 |
| | | | | 715/771 |
| 2017/0052824 | A1* | 2/2017 | Sharma | G06F 9/453 |
| 2019/0123976 | A1* | 4/2019 | Coffin | H04L 67/14 |
| 2019/0187987 | A1 | 6/2019 | Fauchere et al. | |
| 2019/0235726 | A1* | 8/2019 | Vasudev | G06F 3/0489 |
| 2021/0081227 | A1* | 3/2021 | Verma | G06N 5/003 |

OTHER PUBLICATIONS

Carter et al., "KM—Application Specific Triggers?" published in Apr. 2020, retrieved from https://talk.automators.fm/t/km-application-specific-triggers/6973 on Jul. 6, 2023 (5 pages). (Year: 2020).*

"Macro Groups" published by Keyboard Maestro Wiki, last edited on Feb. 5, 2020, retrieved from https://wiki.keyboardmaestro.com/Macro_Groups on Jul. 6, 2023 (7 pages) (Year: 2020).*

"International Search Report and Written opinion Issued in PCT Application No. PCT/US22/018589", Mailed Date: May 19, 2022, 12 Pages.

Communication pursuant to Article 94(3) Received in European Patent Application No. 22716126.2, mailed on Jun. 27, 2024, 9 pages.

* cited by examiner

COMPUTER-GENERATED MACROS AND VOICE INVOCATION TECHNIQUES

BACKGROUND

A user may perform a sequence of actions within an application. In some instances, the same or a similar sequence may be performed multiple times, for example with respect to different parts of a document. However, manually performing such actions may be repetitive, time consuming, and tedious, which may introduce the potential for user error, such as typographical errors and/or formatting inconsistencies.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to computer-generated macros and voice invocation techniques. In examples, a set of actions performed by a user is identified as an action sequence. If user performance of the same action sequence or similar action sequences exceeds a predetermined threshold, a recommendation to create a macro for the action sequence may be generated. Accordingly, the macro may have one or more associated triggers, such that the user may invoke the macro using voice input or via a user interface, among other examples.

A macro may have an associated context in which it applies. In some instances, a trigger used to invoke the macro comprises an indication as to the context in which it is to be invoked. For example, the macro may be invoked in the context of a document, such that one or more document parts are processed according to the macro. As another example, the macro may be invoked to process multiple documents, as may be related in subject matter or associated with the same application, among other examples. A macro may be invoked to process documents and/or parts therein without the document being opened within an associated application or, as a further example, the associated application need not be executing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
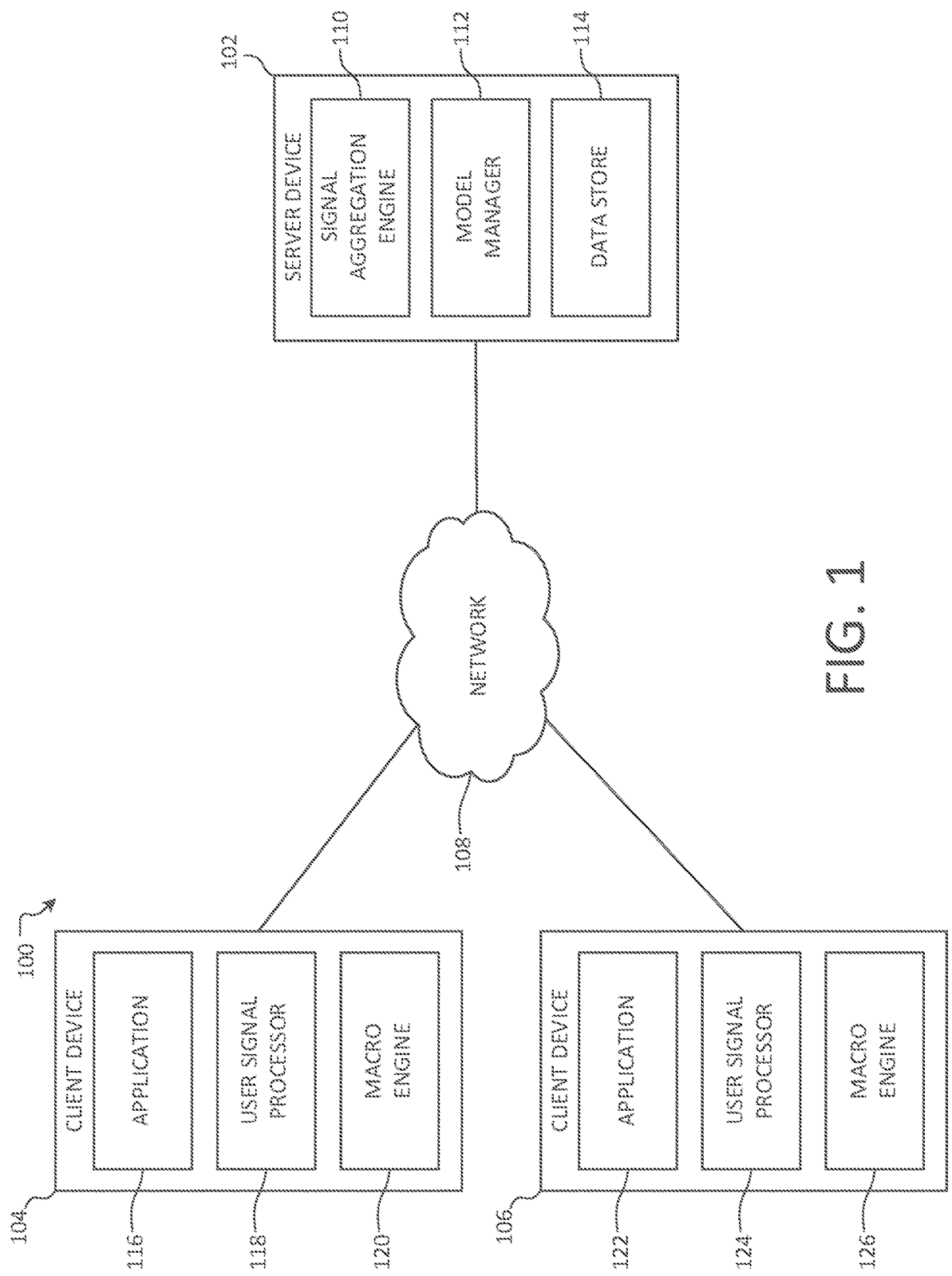
FIG. 1 illustrates an overview of an example system for computer-generated macros and voice invocation techniques according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user may perform any of a variety of actions using an application. Example applications include, but are not limited to, word processing software, spreadsheet software, presentation software, mail software, calendaring software, and/or web browsing software, among other examples. Example actions associated with such applications include, but are not limited to, creating a document, scheduling a meeting, formatting text or other data, and/or reviewing and accepting revisions. However, a user may perform a sequence of actions multiple times. For example, the user may select multiple parts of a document individually and format each selected part according to the same or a similar format. However, manually formatting each document part may be time-consuming and introduce the potential for human error. Further, a user may perform such actions using a mouse, keyboard, and/or other input mechanisms, which may introduce additional complexity, as the user may iteratively select each document portion, after which the user must navigate to and subsequently actuate the appropriate user interface elements.

Accordingly, aspects of the present application relate to computer-generated macros and voice invocation techniques. In examples, a sequence of actions that is repeatedly performed by a user may be identified. A recommendation to create a macro associated with the identified sequence of actions may be presented to the user. Accordingly, the user may use the macro for subsequently performing the action sequence in the same or a similar context. The macro may be invoked using any of a variety of triggers, for example in response to actuation of a user interface element or in response to a keyboard combination. In a further example, a voice trigger may be automatically generated or may be specified at least in part by the user, such that the macro may be invoked using the voice trigger.

As used herein, a user signal may be associated with one or more actions performed by a user within an application. For example, an application may generate telemetry data, at least a part of which is associated with actions performed by a user. As a result, telemetry data generated by one or more applications may be processed to identify user signals. Telemetry data may further comprise information associated with or indicative of any of a variety of contexts. Example contexts include, but are not limited to, a document context (e.g., actions relating to a single document), a similar document context (e.g., actions relating to a set of similar documents), an application context (e.g., actions relating to an application or suite of applications), a user context (e.g., actions for a given user), and a situation context (e.g., actions performed at given time of day, day of week, with a set of open applications, and/or at a given location or type of location), among other examples.

Thus, it will be appreciated that macros generated according to aspects described herein may be applied in any of a variety of contexts. For example, a macro may be invoked with respect to a single document or a set of documents. The set of documents may be associated by subject matter and/or with the same application. In other instances, the set of documents may be associated with different applications. For example, a macro may be invoked to process a word processing document, a spreadsheet document, an email, a calendar appointment, and/or a presentation document.

Similarly, a macro may comprise actions performed in multiple applications (e.g., formatting a word processing document and sending the word processing document as an email or updating the date of a presentation document and sending a calendar invite for the presentation). Further, a document need not be open to be processed using a macro according to aspects described herein. As a further example, a document need not be local to the computing device performing the macro, such that documents stored remotely (e.g., by a shared data store or a cloud collaboration service) may be similarly processed.

As discussed above, a macro is associated with a sequence of actions, such that user invocation of the macro causes the sequence of actions to be performed automatically in response to the user invocation. Candidate action sequences (e.g., for recommendation to a user as described herein) may be identified according to any of a variety of techniques. For example, telemetry data associated with one or more users may be processed according to one or more machine learning models, such that action sequences are identified and tagged accordingly. In examples, the machine learning model may identify action sequences based on associated probabilities for subsequent actions in a sequence. For instance, an n-gram model may be used. As another example, a seq2seq model and/or a recurrent neural network (RNN) may be used according to aspects described herein. As a further example, association rule learning may be used to identify relationships between actions and identify action sequences according to such relationships. Thus, such techniques may be used to identify a subsequent action that is likely to follow a preceding action such that it may be included as part of an action sequence, while an action that is unlikely to follow a preceding action may instead be determined to be part of a new action sequence.

In some examples, a machine learning model may be generated and/or applied to a population of users. For example, a general machine learning model may be associated with a application or a geographic region (e.g., based on associated native languages, number or date formats, or currency). As another example, a general machine learning model may be associated with an entire population of users. A specific machine learning model may be used, which may be associated with a specific user, a specific organization, or specific subject matter, among other examples. For example, a specific model may be associated with one or more contexts according to aspects described herein (e.g., an application context or a user context for one or more users). Thus, it will be appreciated that, as compared to a specific machine learning model, a general machine learning model may be associated with a larger population of users. Additionally, while example general and specific machine learning models are described herein, it will be appreciated that any number and variety of machine learning models may be used for varying user populations.

A prompt may be presented to create a macro that, when invoked using a trigger, performs a sequence of actions. For example, action sequences performed by a user may be tagged according to one or more machine learning models, as discussed above. When it is determined that the same action sequence or similar action sequences are performed by the user, the user may be prompted to create a macro to perform an associated action sequence. In examples, a predetermined threshold and/or predetermined time period is used to determine when to generate such a prompt. For example, if a user performs an action sequence multiple times within a short period of time, the user may be prompted accordingly.

As another example, evaluating the predetermined threshold may comprise determining a lift for a given user as compared to a population of users, such that a lift exceeding the predetermined threshold causes a macro recommendation to be presented. It will be appreciated that such an evaluation need not be restricted to a user versus a population, such that lift may additionally or alternatively be determined with respect to a company, workgroup, and/or job role. Thus, it will be appreciated that while examples are described with respect to using a machine learning model, one or more statistical models may be used in addition or as an alternative to such techniques.

In other examples, telemetry data may be used to determine whether or, in other examples, the degree to which a macro associated with an action sequence is more likely to be used rather than manually performing the action sequence. For example, if a population of users is more likely to use a macro rather than an action sequence associated therewith, a recommendation may be provided to create a macro accordingly. In other examples, a predetermined threshold may be used. Thus, it will be appreciated that any of a variety of criteria may be used to determine whether to present a proposed macro.

A user may customize a recommended macro. As an example, the user may change one or more actions and/or associated properties. In some instances, the user may change an action to a different action, remove an action, add an action, or change the order of actions. In other instances, the user may change properties associated with an action. For example, the user may change a formatting property associated with a formatting action (e.g., a font, font size, or a color) or change a recipient property of a send email action.

A user may specify or change a context associated with the macro. For example, the user may indicate that the macro applies to a single document or a set of documents (e.g., associated by subject matter and/or associated with one or more applications). Thus, while a macro was recommended based on one context, the user may indicate that the macro should apply to a different context. It will be appreciated that such contexts need not be mutually exclusive, such that the user may indicate that the macro applies to a broader set of documents than was initially detected.

A trigger may be specified with which to invoke the macro. Example triggers include, but are not limited to, user interface elements (e.g., in a toolbar or ribbon or in a dropdown menu), hardware input (e.g., using one or more physical buttons), keyboard shortcuts, gestures (e.g., on a touchscreen or in physical space), and/or voice input. Thus, it will be appreciated that any number and variety of triggers may be used. In some examples, one or more triggers may be suggested for association with a macro. For example, a phrase may be determined based one or more actions of the action sequence (e.g., using a generative machine learning model based on associated action names or based on crowd-sourced phrases from one or more users having similar macros). Similarly, a recommended user interface element or other trigger may be presented. In other instances, the user specifies one or more triggers with which the macro is associated, selects one or more triggers from a set of options, or edits an existing or recommended trigger, among other examples. It will be appreciated that any of a variety of additional or alternative triggers may be used. For example, text input may be utilized in a similar manner to the voice input discussed above, such that a user may type to a virtual assistant or "chatbot" to invoke a macro.

In some instances, a trigger may be configured to provide an indication as to a context associated with the macro. For example, a voice input trigger may comprise a portion that provides an indication as to a document, portion of a document, and/or a set of documents that should be processed according to the macro. As another example, a user interface element or keyboard shortcut may process a portion of a document associated with a selection within a document, while a gesture input may similarly provide an indication as to the context with respect to which the macro is invoked.

While examples are described herein in which an action sequence is identified and a macro recommendation is presented accordingly, it will be appreciated that, in other instances, a macro may be generated without explicit user input. For example, rather than prompting a user to create a macro, the macro may be automatically generated (e.g., based on determining the action sequence is performed by the user at a high frequency or with respect to any of a variety of other predetermined thresholds, as discussed above). An indication of the macro may be presented to the user. The indication may comprise information associated with the action sequence, one or more voice triggers, and/or a reason why the macro was created (e.g., the user's use of the macro exceeded that of a population or the macro is more likely to be used than manually performing the action sequence) Similarly, macros may automatically be culled in instances where they are not used for a predetermined amount of time or at predetermined frequency, among other examples. For example, a macro may be automatically created and, if the user does not invoke the macro within a predetermined amount of time, the macro may be automatically deleted.

FIG. 1 an overview of an example system 100 for computer-generated macros and voice invocation techniques according to aspects described herein. As illustrated, system 100 comprises server device 102, client device 104, client device 106, and network 108. In examples, server device 102, client device 104, and client device 106 communicate using network 108, which may comprise a local area network, a wireless network, or the Internet, or any combination thereof, among other examples.

As illustrated, server device 102 comprises signal aggregation engine 110, model manager 112, and data store 114. Signal aggregation engine 110 aggregates user signals from client device 104 and client device 106 (e.g., as may be generated by application 116 and application 122, respectively). For example, signal aggregation engine 110 may categorize user signals based at least in part on an associated application type (e.g., word processor, spreadsheet editor, etc.), geographic region, and/or device type (e.g., based on hardware capabilities, screen size, or available input devices). In some instances, the user signals are received as part of telemetry data, such that signal aggregation engine 110 processes the telemetry data to identify user signals therein. Signal aggregation engine 110 may store user signals in data store 114.

In some examples, signal aggregation engine 110 further aggregates macros from client devices 104 and 106, as may have been created according to aspects described herein. For example, signal aggregation engine 110 may receive an indication of an action sequence and an associated trigger, which may be stored in data store 114. Such aspects may enable triggers to be crowd-sourced for a given macro or, as another example, a macro recommendation to be presented based on a determination that a percentage of users above a predetermined threshold (e.g., as an absolute number or a percentage of users) are using the recommended macro to perform an action sequence.

Model manager 112 generates, updates, and otherwise manages any of a variety of machine learning models according to aspects described herein. For example, model manager 112 may generate a machine learning model based on training data in data store 114 (e.g., as may be generated by signal aggregation 110 according to aspects described herein). For example, the training data may comprise action sequences and associated triggers of macros used by users of client device 104 and client device 106. The macros may be user-created and/or computer-generated according to aspects described herein. Accordingly, model manager 112 may generate a general machine learning model, which may be provided to client device 104 and client device 106 in order to generate macro recommendations. In some instances, model manager 112 generates multiple general machine learning models, as may be associated with a specific application or a specific geographic region (e.g., based on associated native languages, number or date formats, or currency), among other examples.

Client device 104 is illustrated as comprising application 116, user signal processor 118, and macro engine 120. System 100 is further illustrated as comprising client device 106, which comprises application 122, user signal processor 124, and macro engine 126. Aspects of client device 106 are similar to those of client device 104 and are therefore not necessarily re-described below in detail.

Application 116 may be any of a variety of software, including, but not limited to, word processing software, spreadsheet software, presentation software, mail software, calendaring software, and/or web browsing software, among other examples. While examples are described with respect to a single application, it will be appreciated that, in other examples, application 116 may be a suite of software, such that a sequence of actions may comprise actions associated with multiple applications of the suite. As a further example, application 116 may be at least a part of an operating system executed by client device 104.

User signal processor 118 processes user signals generated by application 116 (e.g., as may be generated in response to user input processed by application 116). For example, user signal processor 118 may process telemetry data generated by application 116 to identify user signals, similar to the aspects described above with respect to signal aggregation engine 110. In some instances, user signal processor 118 may identify user signals and provide an indication of the identified signals to signal aggregation engine 110, such that signal aggregation engine 110 need not process telemetry data to identify such signals.

In examples, user signal processor 118 identifies an action sequence based at least in part on processing user signals associated with application 116 using a machine learning model (e.g., as may be generated by model manager 112). In some instances, a general machine learning model from model manager 112 is used in conjunction with a specific machine learning model, as may be generated, updated, and/or otherwise maintained by user signal processor 118. For example, a general machine learning model from model manager 112 may be received by user signal processor 118, which may then be tuned by user signal processor 118 according to user signals and feedback provided by the user of client device 104. Thus, the general machine learning model may be for a population of users, while the specific machine learning model may be tuned to the user of client device 104.

When user signal processor 118 identifies an action sequence, it may be determined whether a macro recommendation should be provided. For example, a predetermined threshold and/or predetermined period of time may be used to determine whether usage of the same action sequence or similar action sequence exceeds such thresholds. If it is determined that a macro recommendation should be provided, a prompt may be displayed by client device 104, such that a user may create a macro based on the action sequence accordingly. In examples, the user may customize the macro as discussed above, for example to associate one or more triggers with the macro.

The user may invoke the macro using a trigger associated therewith, as maybe identified by macro engine 120. For example, macro engine 120 may receive voice input, which may be processed to determine that the voice input is a trigger for a macro. In examples, macro engine 120 processes the voice input to determine a context for which the macro is to be invoked. In other example, macro engine 120 receives an indication that a user has actuated a user interface element (e.g., as may be received from application 116), such that macro engine 120 performs the action sequence associated with the macro accordingly.

As discussed above, a macro may be invoked for any of a variety of documents and, further, a document need not be open in application 116 to be processed by macro engine 120. In examples, macro engine 120 may determine multiple parts of a document to process based at least in part on an indication associated with the macro. For example, a user may have indicated a type of subpart (e.g., a header, a bulleted list, or a column having a certain format or heading) or a pattern associated with the macro when the macro was created by user signal processor 118 or as part of the trigger identified by macro engine 120. In other examples, such a determination may be made automatically based on context associated therewith (e.g., as may be determined by telemetry data, a location of client device 104, and/or a set of applications that are executed by client device 104 and/or documents that are open or recently opened). As a further example, macro engine 120 may identify multiple documents to process. Thus, it will be appreciated that any number of document subparts and/or documents may be processed. Further, a document may comprise any of a variety of data, including, but not limited to, plain text, rich text, image data, audio data, and/or video data.

Figure 2:
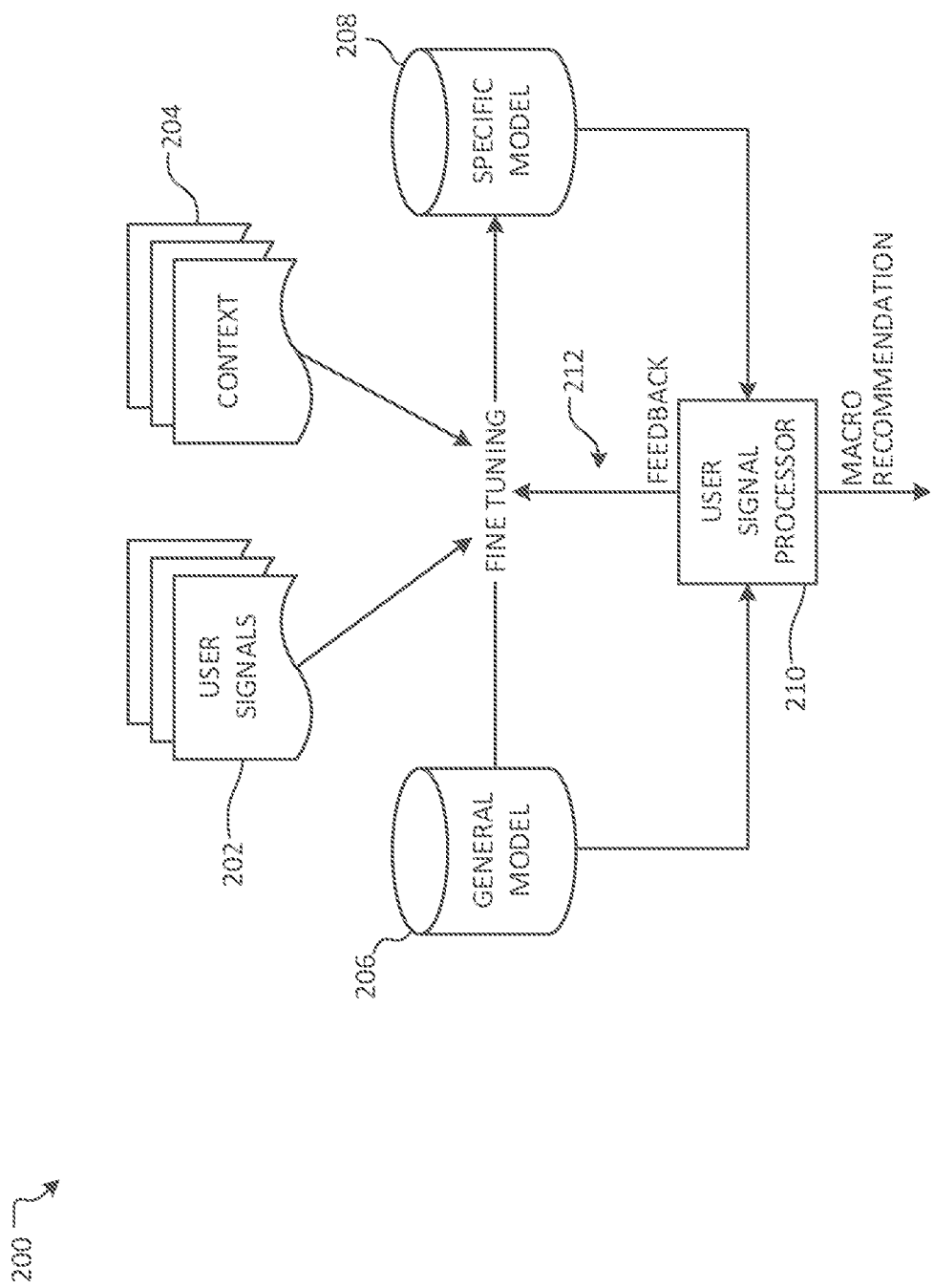
FIG. 2 illustrates an overview of an example block diagram for training a machine learning model according to aspects described herein.

FIG. 2 illustrates an overview of an example block diagram 200 for training a machine learning model according to aspects described herein. As illustrated, general model 206 and specific model 208 are utilized by user signal processor 210 (e.g., which may be similar to user signal processor 118 discussed above with respect to FIG. 1) to identify action sequences and provide macro recommendations as discussed above. In examples, general model 206 and specific model 208 may each be an n-gram model or a seq2seq model using an RNN, among other examples.

General model 206 may have been generated by a model manager, such as model manager 112 discussed above with respect to FIG. 1. Specific model 208 may have been generated based on general model 206. For example, specific model 208 may be a general model that is tuned based at least in part on user signals 202 and context 204 (e.g., as may be associated with an application, such as application 116 or 122 in FIG. 1). Accordingly, specific model 208 may be tuned for a specific user of a computing device, such that it may identify action sequences that are more specific to that user and not necessarily common within a population as a whole.

Arrow 212 further illustrates that feedback received from a user may be used to fine tune specific model 208 accordingly. Example feedback includes, but is not limited to, an indication to create, change, or ignore a macro recommendation. Such tuning of specific model 208 may cause user signal processor 210 to provide more relevant macro recommendations to a user over time. Additionally, general model 206 may be updated or replaced, for example as a result of receiving an updated model from a model manager (e.g., model manager 112 in FIG. 1).

Figure 3:
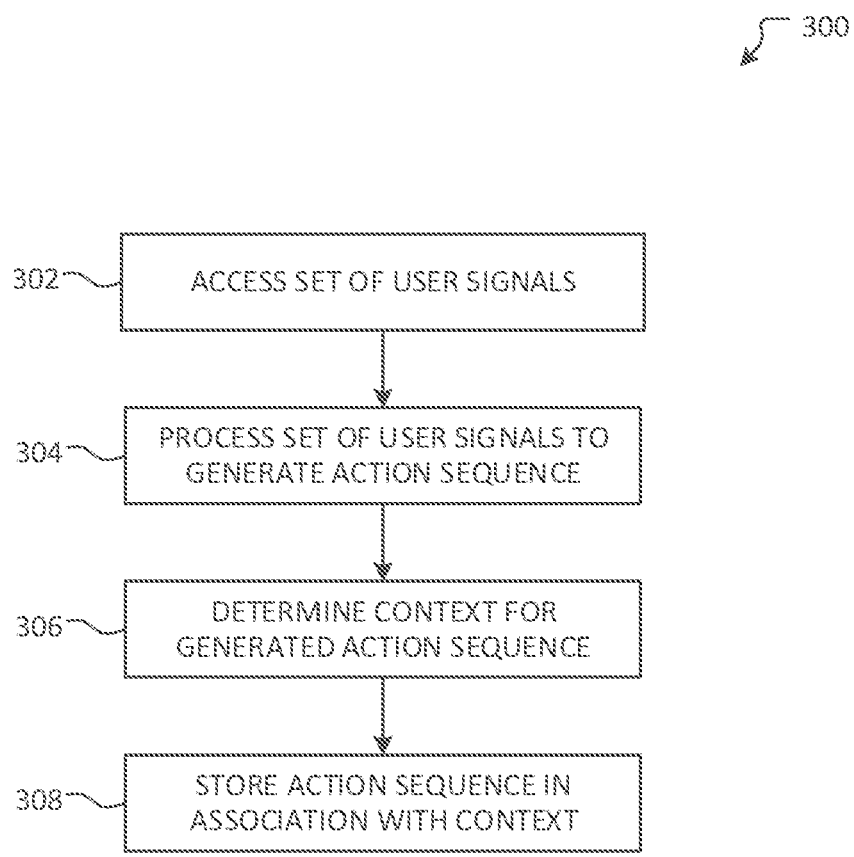
FIG. 3 illustrates an overview of an example method for determining an action sequence from a set of user signals according to aspects described herein.

FIG. 3 illustrates an overview of an example method 300 for determining an action sequence from a set of user signals according to aspects described herein. For example, aspects of method 300 may be performed by a user signal processor, such as user signal processor 118 in FIG. 1 or user signal processor 210 in FIG. 2.

Method 300 begins at operation 302, where a set of user signals are accessed. The set of user signals may be generated by an application, such application 116 or 122 of client devices 104 and 106, respectively, in FIG. 1. For example, each user signal may be associated with an action performed by a user of the computing device. In other examples, a signal may be associated with multiple actions or, as another example, multiple signals may be associated with a single action. In other instances, the set of user signals may be accessed from a data store, such as data store 114 in FIG. 1. Thus, it will be appreciated that the signals need not be accessed from a local data store.

At operation 304, the set of user signals is processed to generate an action sequence. For example, the set of user signals may be processed according to one or more machine learning models, as discussed above with respect to FIG. 2. As an example, a general machine learning model (e.g., general model 206) and a specific machine learning model (specific model 208) may be used to process the set of user signals. In examples, the model output of each model may be weighted or, as another example, one model may be selected over another model (e.g., based on accuracy). In some instances, operation 304 comprises selecting a model from a set of available models, as may be the case when different specific and/or general models are applicable to difference contexts. For example, a general and/or specific model may be associated with a given application, such that operation 304 comprises determining such a model based at least in part on the context indicating the application.

Flow progresses to operation 306, where a context is determined for the generated action sequence. As discussed above, example contexts include, but are not limited to, a document context, a similar document context, an application context, a user context, and a situation context, among other examples. In some instances, such a context may be determined based at least in part on the set of accessed user signals and/or information provided by a user's computing device.

At operation 308, the action sequence is stored in association with the context. For example, the stored action sequence may be accessed later to determine whether a user frequently performs such an action sequence, in which case a macro recommendation may be presented. As another example, the action sequence may be stored in a data store (e.g., data store 114), such that the action sequence may be processed as part of action sequences for a population of users according to aspects described herein. Flow terminates at operation 308.

Figure 4:
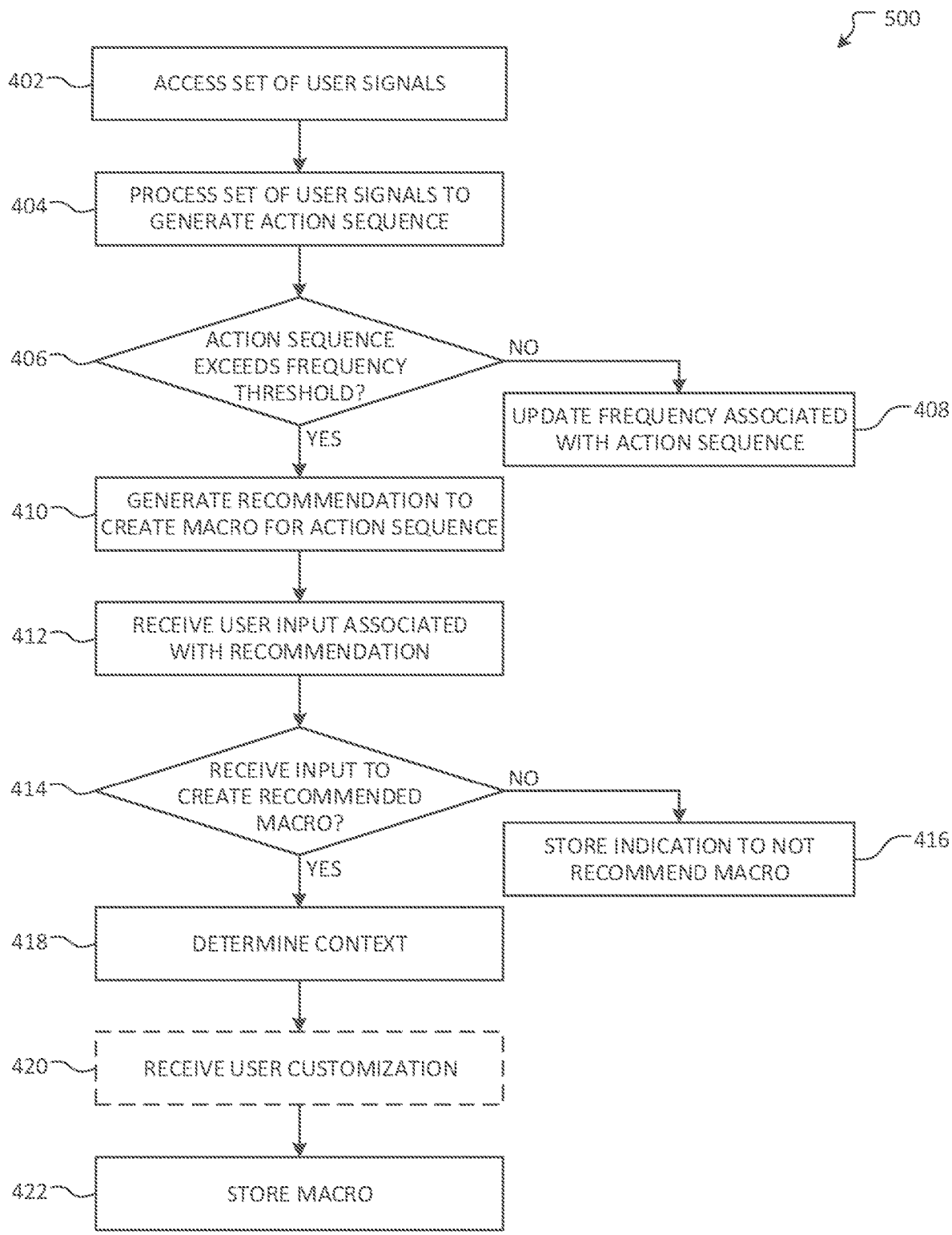
FIG. 4 illustrates an overview of an example method for generating a macro recommendation for performing an identified action sequence according to aspects described herein.

FIG. 4 illustrates an overview of an example method 400 for generating a macro recommendation for performing an identified action sequence according to aspects described herein. In examples, aspects of method 400 may be performed by a user signal processor, such as user signal processor 118 in FIG. 1 or user signal processor 210 in FIG. 2.

Method 400 begins at operation 402, where a set of user signals is accessed. The set of user signals may be generated by an application, such application 116 or 122 of client devices 104 and 106, respectively, in FIG. 1. For example, each user signal may be associated with an action performed by a user of the computing device. In other examples, a signal may be associated with multiple actions or, as another example, multiple signals may be associated with a single action. In other instances, the set of user signals may be accessed from a data store, such as data store 114 in FIG. 1. Thus, it will be appreciated that the signals need not be accessed from a local data store.

At operation 404, the set of user signals is processed to generate an action sequence. For example, the set of user signals may be processed according to one or more machine learning models, as discussed above with respect to FIG. 2. As an example, a general machine learning model (e.g., general model 206) and a specific machine learning model (specific model 208) may be used to process the set of user signals. In examples, the model output of each model may be weighted or, as another example, one model may be selected over another model (e.g., based on accuracy). In some instances, operation 404 comprises selecting a model from a set of available models, as may be the case when different specific and/or general models are applicable to difference contexts. For example, a general and/or specific model may be associated with a given application, such that operation 404 comprises determining such a model based at least in part on the context indicating the application.

Flow progresses to determination 406, where it is determined whether the generated action sequence exceeds a frequency threshold. For example, a predetermined threshold and/or predetermined time period may be used such that, if a user performs an action sequence multiple times within a short period of time, the user may be prompted to create a macro accordingly. It will be appreciated that any of a variety of additional or alternative evaluations may be used. For example, determination 406 may comprise determining whether a population of users is more likely to use a macro rather than manually performing the action sequence or whether a lift determined with respect to the user as compared to a population of users exceeds a predetermined threshold.

If it is determined that the action sequence does not exceed a frequency threshold, flow branches "NO" to operation 408, where a frequency associated with the action sequence is updated. In examples, additional or alternative usage data is updated, such as a time that the action sequence was last performed and/or a number of times the action sequence was performed in a predefined time period. Flow terminates at operation 408.

If, however, it is determined that the action sequence exceeds the frequency threshold (or, as discussed above, any of a variety of additional or alternative evaluations), flow instead branches "YES" to operation 410, where a recommendation is generated to create a macro for the action sequence. For example, the recommendation may comprise an indication as to the identified action sequence, a recommended voice trigger to invoke the macro, and/or a percentage of users having a similar macro, among other examples.

At operation 412, user input associated with the recommendation is received. For example, a user may provide input that indicates that the user wishes to create the macro, reject the recommendation, or edit the recommended macro. The received input may be explicit user input (e.g., a user actuating a user interface element, performing a keyboard combination, or performing a gesture) or may be implicit user input (e.g., a user ignoring the recommendation for a predetermined amount of time or a user attempting to invoke the macro using a recommended trigger as though the recommendation has already been accepted). It will be appreciated that any of a variety of additional or alternative user inputs may be received according to aspects described herein.

If, at determination 414, it is determined that user input is received to not create the recommended macro, flow branches "NO" to operation 416, where an indication is stored to not recommend the macro. As a result, a recommendation to create the same or a similar macro may not be generated for the future or, as another example, may not be generated until at least a predetermined amount of time has elapsed. In some examples, operation 416 comprises processing and/or storing the received as feedback to a machine learning model (e.g., as was indicated as arrow 212 for specific model 208 in FIG. 2). Flow terminates at operation 416.

However, if it is determined at determination 414 that user input is received to create the recommended macro, flow instead branches "YES" to operation 418, where a context in which to invoke the macro is determined. In some instances, the context may be determined automatically based on the set of user signals that were accessed at operation 402. For example, the set of user signals may be processed to identify context in which at least a majority of user signals were generated. As an example, if the user signals relate to one paragraph or another subpart of a document, the context may be determined to be one or more subparts of a document or the document itself. As another example, if the user signals relate to multiple documents, content of the documents may be processed to determine whether they are related to similar subject matter, such that the subject matter may be determined to be the context. In other instances, it may be determined that the signals are associated with an application or a suite of applications, among other examples. Thus, it will be appreciated that any of a variety of contexts and/or techniques to determine such contexts may be used. For instance, a general or a specialized machine learning model may similarly generate a context for a given set of user signals.

At operation 420, user customization is received. Operation 420 is illustrated using a dashed box to indicate that, in other examples, operation 420 may be omitted such that flow progresses from operation 418 to operation 422 without user customization. In examples, operation 420 comprises receiving one or more changes to the generated action sequence, such as adding an action, removing an action, changing an action, and/or changing the order of an action within the sequence. In other examples, operation 420 comprises receiving a change to a trigger associated with the macro. For example, the user may change a recommended trigger, may add another trigger, or may remove a trigger. In an example, the user may change a context that was determined at operation 418. For example, the user may make a context more broad or may add an additional context. Thus, it will be appreciated that a macro need not be limited to a single context and may have any number of associated contexts of varying scope.

Flow progresses to operation 422, where the macro is stored. For example, the macro may be stored at the user's computing device, such that the user may invoke the macro at the computing device according to one or more triggers associated therewith. In other examples, the macro may be stored remotely (e.g., at a server device such as server device 102 in FIG. 1), thereby enabling the user to use the macro at any of a variety of computing devices. As an example, the macro may be associated with an account of the user. In some instances, macros may be shared among any number of users. For example, a group of users, such as a team or an organizational unit, may share at a subset of their macros with one another. Thus, in some instances, user customization received at operation 420 may comprise an indication as to whether the macro is shared and/or a set of users with which to share the macro. Flow terminates at operation 422.

Figure 5:
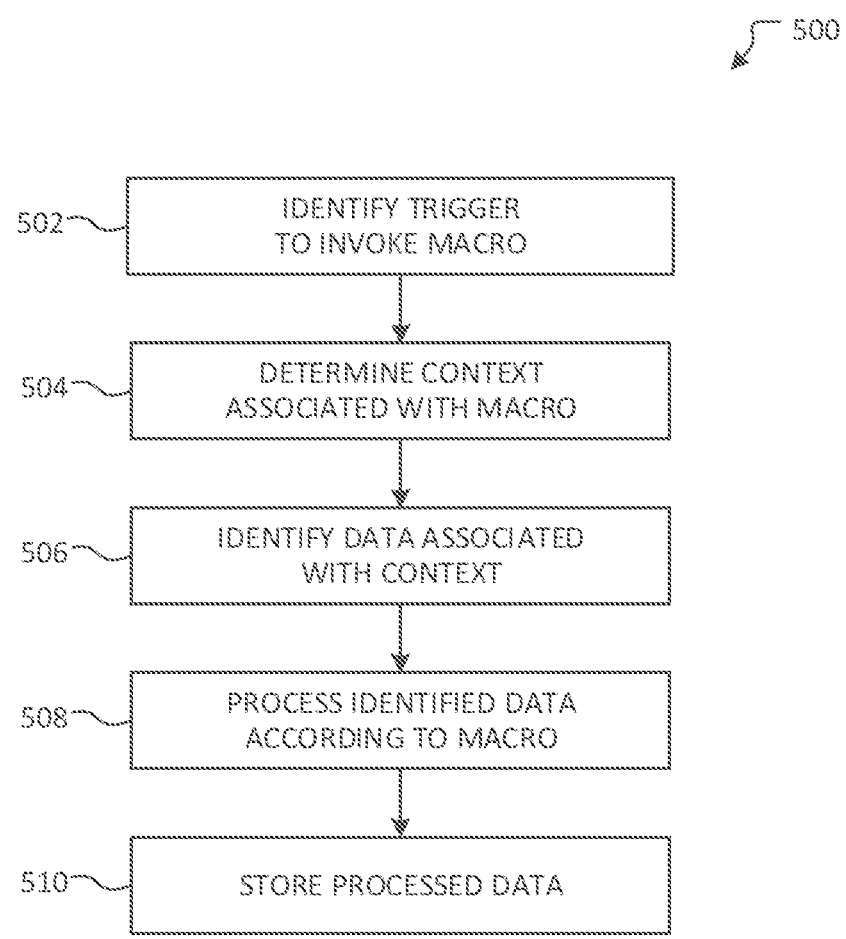
FIG. 5 illustrates an overview of an example method for processing data using a computer-generated macro according to aspects described herein.

FIG. 5 illustrates an overview of an example method 500 for processing data using a computer-generated macro according to aspects described herein. In examples, aspects of method 500 are performed by a macro engine, such as macro engine 120 or 126 in FIG. 1.

Method 500 begins at operation 502, where a trigger to invoke a macro is identified. Example triggers include, but are not limited to, user interface elements, hardware input, keyboard shortcuts, gestures, and/or voice input. Accordingly, operation 502 may comprise receiving user input associated with a trigger or, as another example, user signals may be processed to identify a trigger associated with a macro.

At operation 504, a context associated with the macro is determined. For example, the trigger may be used to identify a macro associated therewith in a data store. The macro may further be associated with one or more contexts to which the macro applies. In examples, operation 504 comprises determining a context from a set of contexts for a macro. For example, each context may be evaluated to determine whether it is associated with the user's current context.

In instances where multiple contexts are associated with a user's current context (e.g., a first context is associated with the user's current application and a second context is associated with the subject matter of the current document), the user may be prompted to resolve the ambiguity. The prompt may use a similar input technique as the trigger. For example, if the trigger comprised voice input, the prompt may comprise voice output to which a user can speak a response. As another example, if the trigger comprised actuation of a user interface element, a user interface associated therewith may be updated to comprise the prompt to resolve the ambiguity. As discussed above, the trigger identified at operation 502 may, in some instances, comprise an indication of a context in which to invoke the macro. For example, the trigger may specify a document, a set of documents, a global context, or any of a variety of other contexts.

At operation 506, data associated with the determined context is identified. For example, operation 506 may comprise identifying one or more document parts associated with the context or multiple documents and, in some examples, one or more parts therein. As noted above, the documents need not be open, such that the documents may be processed according to the macro even if they are not open or, as a further example, even if the associated application is not currently executing. Further, the identified data need not be locally stored, such that remote data may be processed according to aspects of method 500. For example, the remote data may be accessed, processed, and saved or, as another example, instructions may be provided to the remote data store, such that the data is remotely processed according to the macro.

Flow progresses to operation 508, where the identified data is processed according to the macro. For example, each action of the action sequence may be performed with respect to the identified data, thereby generated processed data. In examples, where multiple subparts and/or multiple documents are subject to macro processing, operation 508 may be iteratively processed to process each instance of identified data accordingly. It will be appreciated that such processing need not be performed serially, such that at least a part of the processing may be performed contemporaneously and/or in parallel.

At operation 510, the processed data is stored, for example in place of the identified data, thereby updating the document according to the invoked macro. In other instances, the macro may cause additional data to be generated, such as creating a new document (e.g., a new email, a new calendar appointment, or a document in a different format). Such data may be stored accordingly and, in some examples, the macro may provide an indication as to where the data is stored. In some instances, operations 506, 508, and/or 510 may request user input as part of identifying data, processing data, and/or storing data. Thus, it will be appreciated that macro execution may take any of a variety of forms and that, further, macro execution need not be fully automatic such that user input may affect at least a part of such execution. Method 500 terminates at operation 510.

Figure 6:
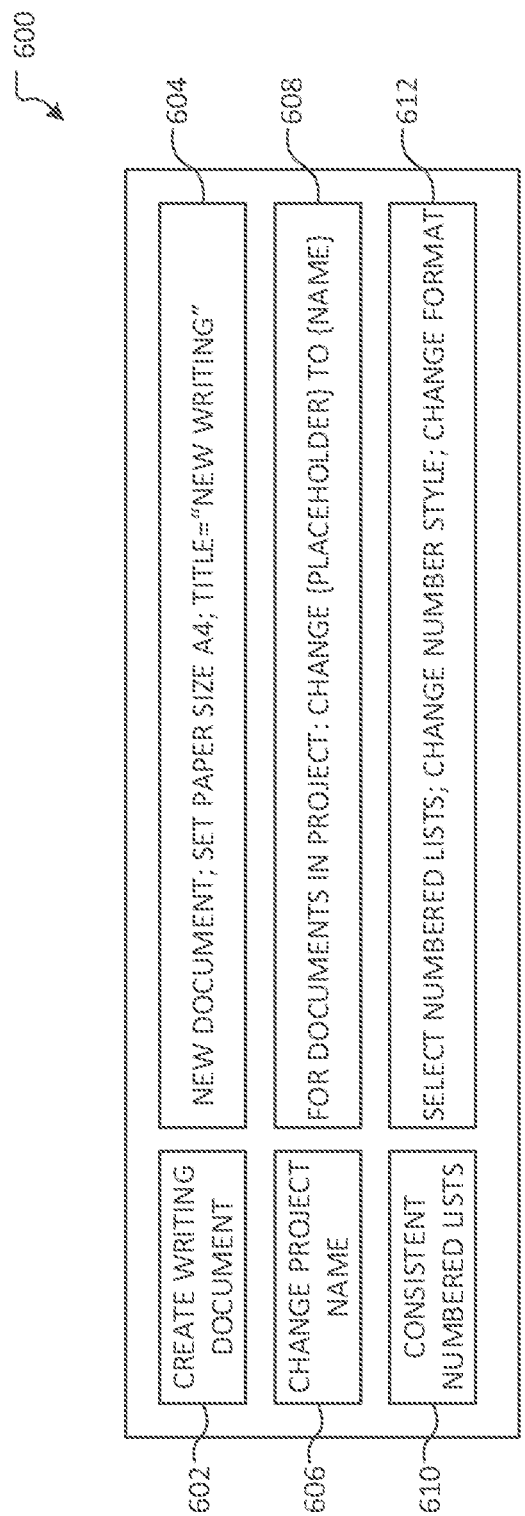
FIG. 6 illustrates an overview of an example user interface for presenting computer-generated macros to a user according to aspects described herein.

FIG. 6 illustrates an overview of an example user interface 600 for presenting computer-generated macros to a user according to aspects described herein. In examples, user interface 600 may be presented to enable a user to manage macros created according to aspects described herein. In other examples, a user interface similar to at least a part of user interface 600 may be presented to recommend that a macro be created.

As illustrated, user interface 600 comprises triggers 602, 606, and 610, for action sequences 604, 608, and 612, respectively. Thus, three macros are illustrated, the first having trigger 602 and action sequence 604, the second having trigger 606 and action sequence 608, and the third having trigger 610 and action sequence 612.

In examples, triggers 602, 606, and 610 are user interface elements that, when actuated, enable a user to modify a macro associated therewith. For example, a user may be able to modify a trigger, add a trigger, or remove a trigger as a result of actuating triggers 602, 606, or 610. In some instances, triggers 602, 606, and 610 may resemble user interface elements usable to invoke each respective macro or, as another example, actuating triggers 602, 606, and 610 may invoke an associated macro accordingly.

Action sequences 604, 608, and 612 comprise an indication as to at least a part of an action sequence associated with a macro. For example, action sequence 608 illustrates that documents associated with a project will be processed to change a "{placeholder}" to a "{name}." In such instances, user input may be requested to provide values for {placeholder} and {name} or, in other examples, {placeholder} and {name} may be variables that are defined using any of a variety of other techniques. When user input is received via action sequences 604, 608, or 612, a user may be able to edit the action sequence, for example, changing actions, adding actions, removing actions, and/or changing the order of one or more actions.

It will be appreciated that any of a variety of additional or alternative user interface elements may be used. For example, action sequences may be represented as a timeline or a bulleted list, rather than a comma-separated list. In other examples, user interface 600 may comprise an indication as to one or more contexts associated with each macro, thereby enabling a user to actuate such an indication to change the associated contexts accordingly.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
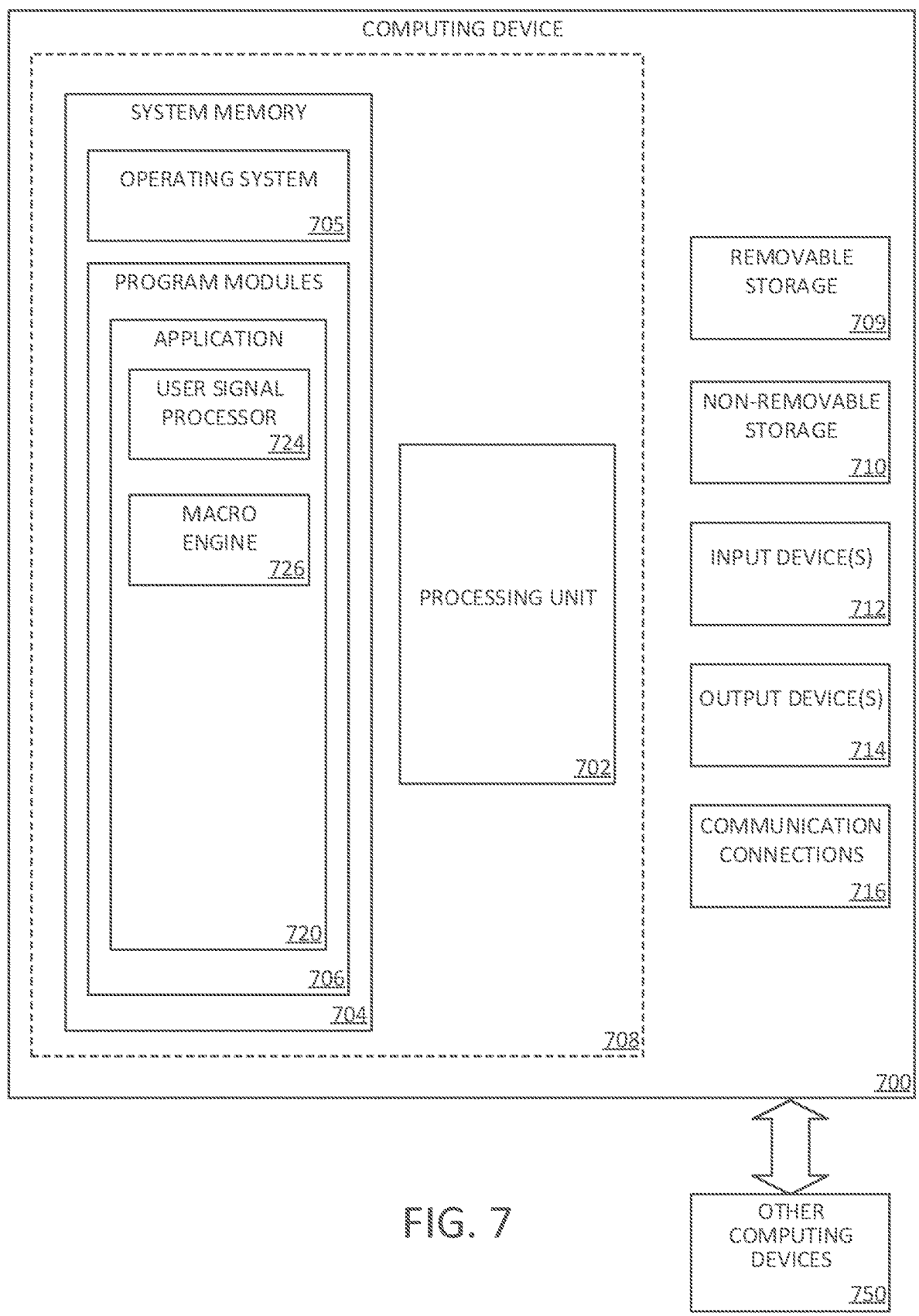
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including server device 102, client device 104, and client device 106 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store user signal processor 724 and macro engine 726. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
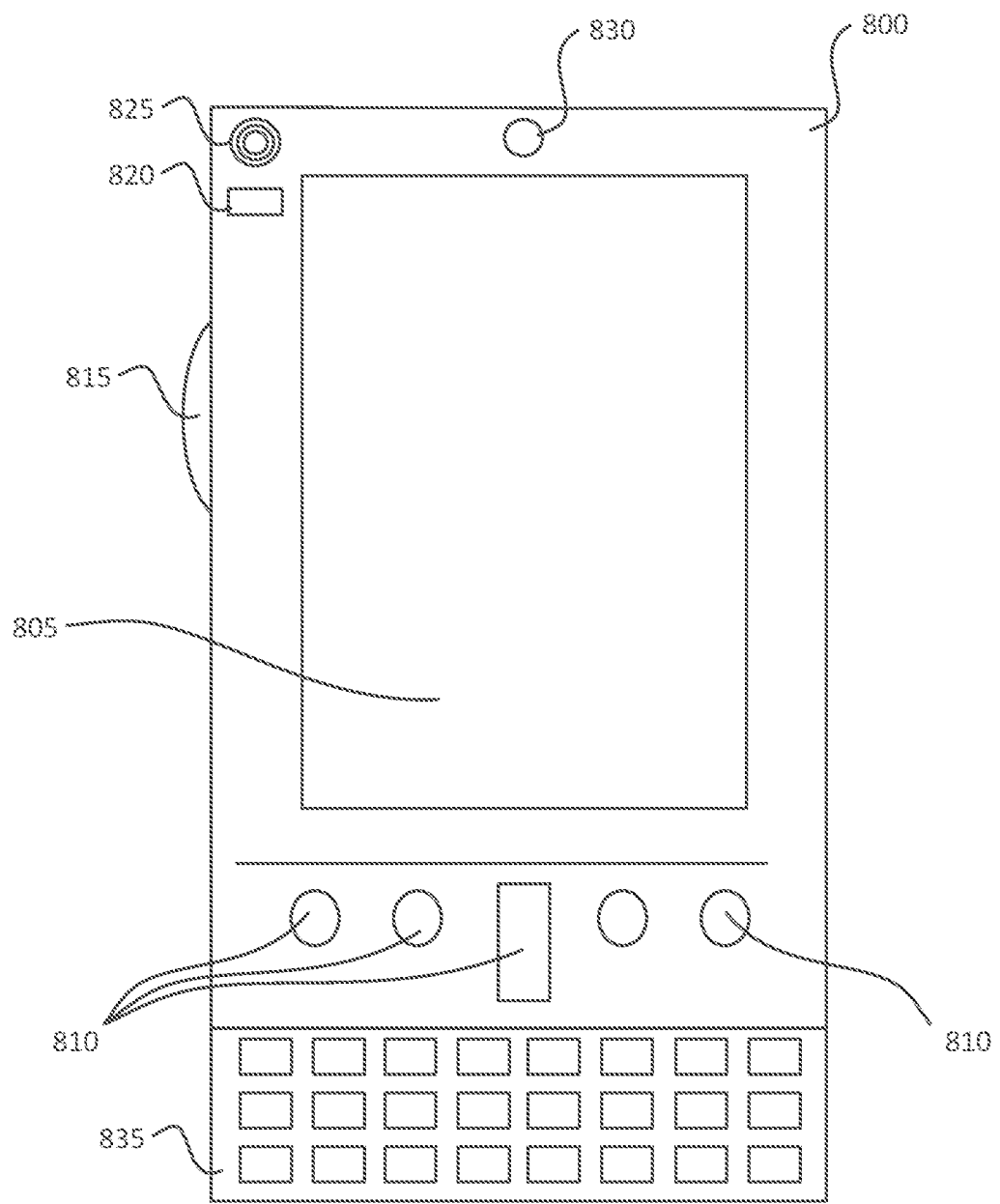
FIGS. 8A and 8B are simplified block diagrams of a mobile computing device with which aspects of the present disclosure may be practiced.
Figure 8B:
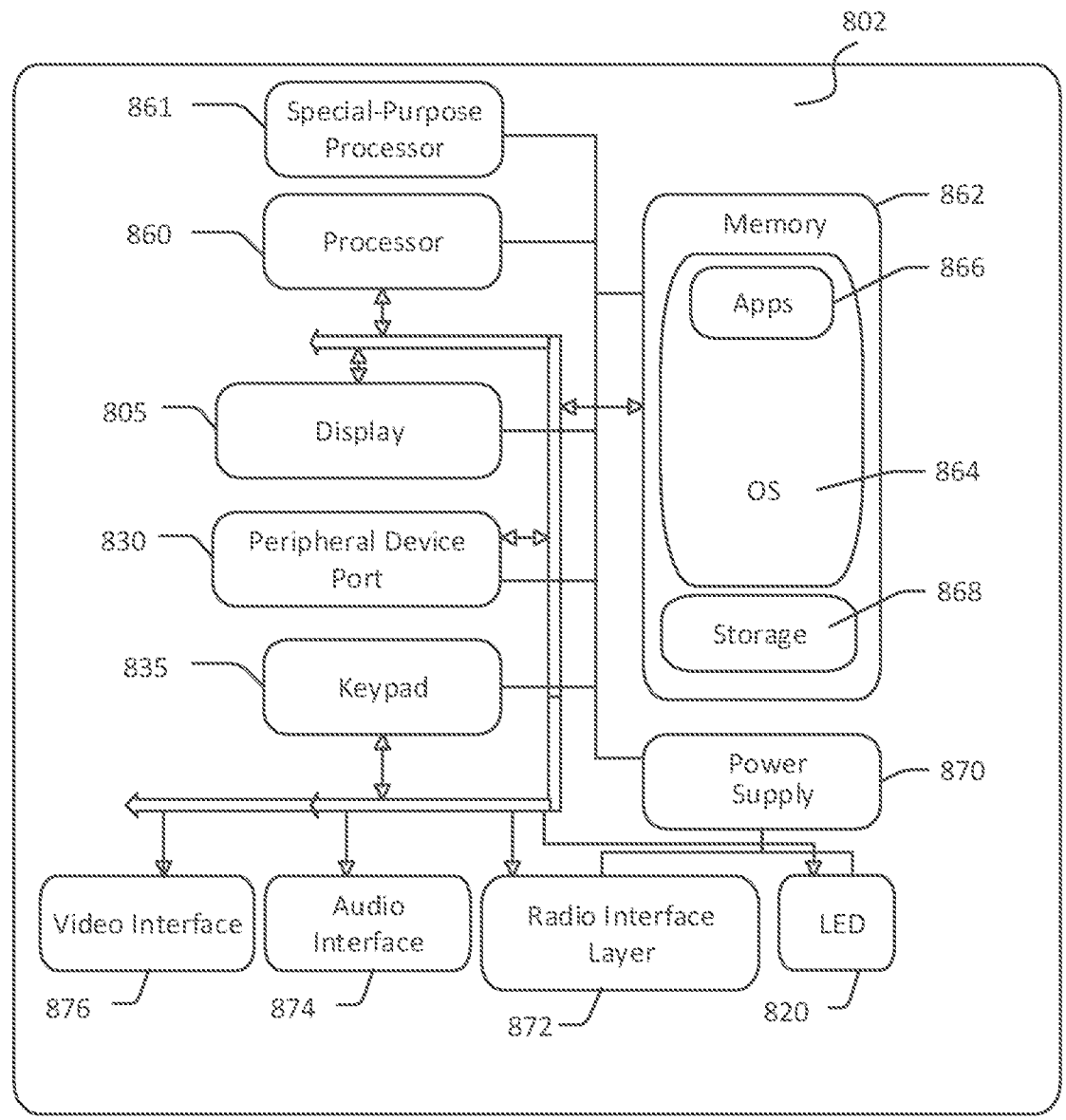

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network Similarly, such data/information may be readily transferred between computing devices for storage and use according to well-known data/information transfer and storage means, including electronic mail and collaborative data/information sharing systems.

Figure 9:
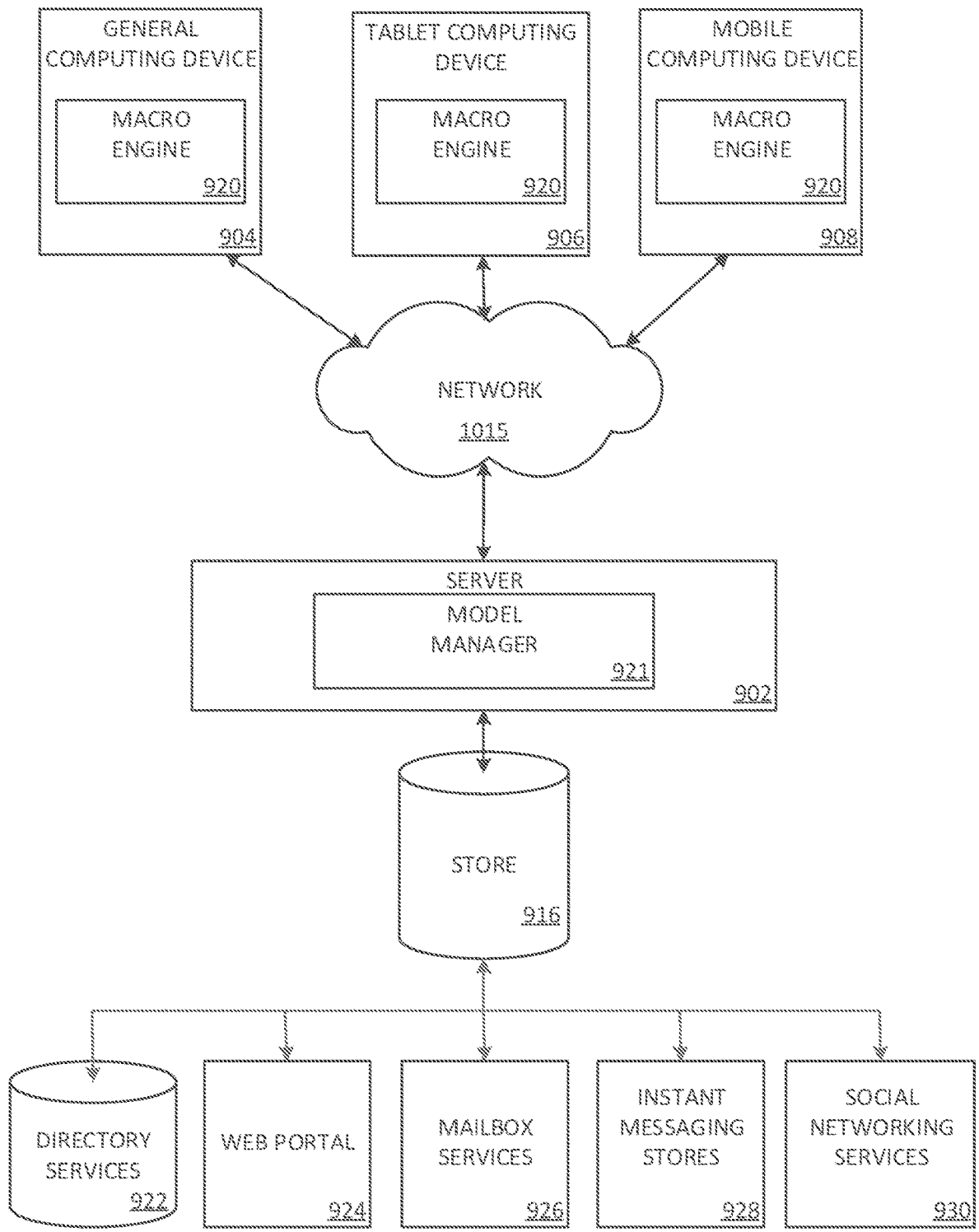
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A macro engine 920 may be employed by a client that communicates with server device 902, and/or model manager 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
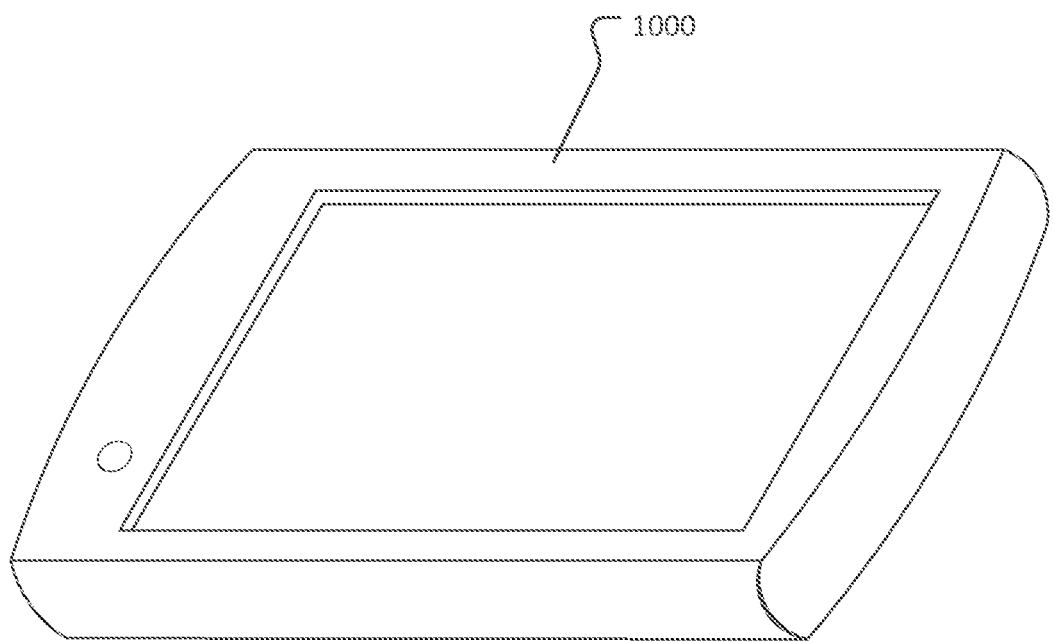
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: generating, based on a set of user signals, an action sequence associated with an application; determining the action sequence is performed above a predetermined threshold; based on determining the action sequence is performed above the predetermined threshold, generating a recommendation to create a macro associated with the action sequence; receiving a user indication to create the macro; and storing the macro in association with a trigger that, when identified, causes invocation of the macro. In an example, the set of operations further comprises determining a context associated with the action sequence and the macro is stored in further association with the determined context. In a further example, the generated recommendation comprises a recommended trigger for the macro; the received user indication comprises an indication to accept the recommended trigger; and storing the macro comprises storing the macro in association with the recommended trigger. In yet another example, the generated recommendation comprises a recommended trigger generated based on at least one of an action of the action sequence or a trigger associated with a macro of another user. In a further still example, the trigger comprises at least one of voice input, user interface input, or text input. In an example, the received user indication comprises at least one of: an edit to the action sequence; an edit to a recommended trigger; or a user-specified trigger. In another example, generating the action sequence comprises processing the set of user signals using a machine learning model configured to identify action sequences based at least in part on a likelihood that a preceding action is followed by a subsequent action. In a further example, invocation of the macro comprises processing a first document and a second document and the first document is associated with the application.

In another aspect, the technology relates to a method for invoking a macro in response to a trigger. The method comprises: identifying, by a computing device, the trigger to invoke the macro, wherein the trigger comprises at least one of voice input, user interface input, or text input; and in response to identifying the trigger to invoke the macro: determining a context associated with the macro; identifying, based at least in part on the determined context, data to process using the macro; and performing, by the computing device, an action sequence of the macro to process the identified data according to the determined context. In an example, identifying the trigger comprises processing a set of user signals. In another example, determining the context associated with the macro comprises processing the identified trigger to identify a user indication of the context. In a further example, determining the context associated with the macro comprises determining the context from a set of contexts associated with the macro. In yet another example, the data to process using the macro comprises a set of document parts associated with one or more documents. In yet another example, at least one document of the one or more documents is not open in an application for the at least one document.

In a further aspect, the technology relates to a method for creating a system-generated macro. The method comprises: generating, based on a set of user signals, an action sequence associated with an application; determining performance of the action sequence exceeds a predetermined threshold; based on determining performance of the action sequence exceeds the predetermined threshold, generating a recommendation to create a macro associated with the action sequence; receiving a user indication to create the macro; and storing the macro in association with a trigger that, when identified, causes invocation of the macro. In an example, the method further comprises determining a context associated with the action sequence and the macro is stored in further association with the determined context. In another example, the generated recommendation comprises a recommended trigger generated based on at least one of an action of the action sequence or a trigger associated with a macro of another user. In a further example, the trigger comprises at least one of voice input, user interface input, or text input. In yet another example, the trigger comprises at least one of voice input, user interface input, or text input. In a further still example, invocation of the macro comprises processing a first document and a second document and the first document is associated with the application.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   generating, based on a set of user signals for a first context, an action sequence associated with a first application of the first context;
   determining the action sequence is performed above a predetermined threshold;
   based on determining the action sequence is performed above the predetermined threshold, generating a recommendation to create a macro associated with the action sequence;
   receiving a user indication to create the macro;
   storing the macro in association with a trigger generated from the action sequence;
   identifying the trigger associated with the macro, wherein the trigger comprises an indication of a second context that is different from the first context and the second context comprises a second application different from the first application; and
   invoking, based on the identification of the trigger, the macro for the second context, thereby invoking the macro in a different context than the first context in which the action sequence was identified.

2. The system of claim 1, wherein the macro is stored in further association with the first context.

3. The system of claim 1, wherein:
   the generated recommendation comprises a recommended trigger for the macro;
   the received user indication comprises an indication to accept the recommended trigger; and
   storing the macro comprises storing the macro in association with the recommended trigger.

4. The system of claim 1, wherein the generated recommendation comprises a recommended trigger generated based on at least one of an action of the action sequence or a trigger associated with a macro of another user.

5. The system of claim 1, wherein the trigger comprises at least one of voice input, user interface input, or text input.

6. The system of claim 1, wherein the received user indication comprises at least one of:
   an edit to the action sequence;
   an edit to a recommended trigger; or
   a user-specified trigger.

7. The system of claim 1, wherein generating the action sequence comprises processing the set of user signals using a machine learning model configured to identify action sequences based at least in part on a likelihood that a preceding action is followed by a subsequent action.

8. The system of claim 1, wherein invocation of the macro comprises processing a first document and a second document and the first document is associated with the first application.

9. A method for creating a system-generated macro, the method comprising:
   generating, based on a set of user signals for a first context, an action sequence associated with a first application of the first context;
   determining performance of the action sequence exceeds a predetermined threshold;
   based on determining performance of the action sequence exceeds the predetermined threshold, generating a recommendation to create a macro associated with the action sequence;
   receiving a user indication to create the macro;
   storing the macro in association with a trigger generated from the action sequence;
   identifying the trigger associated with the macro, wherein the trigger comprises an indication of a second context that is different from the first context and the second context comprises a second application different from the first application; and
   invoking, based on the identification of the trigger, the macro for the second context, thereby invoking the macro in a different context than the first context in which the action sequence was identified.

10. The method of claim 9, wherein the macro is stored in further association with the first context.

11. The method of claim 9, wherein the generated recommendation comprises a recommended trigger generated based on at least one of an action of the action sequence or a trigger associated with a macro of another user.

12. The method of claim 9, wherein the trigger comprises at least one of voice input, user interface input, or text input.

13. The method of claim 9, wherein generating the action sequence comprises processing the set of user signals using a machine learning model configured to identify action sequences based at least in part on a likelihood that a preceding action is followed by a subsequent action.

14. The method of claim 9, wherein invocation of the macro comprises processing a first document and a second document and the first document is associated with the first application.

15. A method for creating a system-generated macro, the method comprising:
- generating, based on a set of user signals for a first context, an action sequence associated with a first document of the first context, wherein the first document is associated with a first application;
- determining performance of the action sequence exceeds a predetermined threshold;
- based on determining performance of the action sequence exceeds the predetermined threshold, generating a recommendation to create a macro associated with the action sequence;
- receiving a user indication to create the macro;
- storing the macro in association with a trigger generated from the action sequence;
- identifying the trigger associated with the macro, wherein the trigger comprises an indication of a second context that is different from the first context and the second context comprises a second document of a second application different from the first application; and
- invoking, based on the identification of the trigger, the macro for the second context, thereby invoking the macro in a different context than the first context in which the action sequence was identified.

16. The method of claim 15, wherein the macro is stored in further association with the first context.

17. The method of claim 15, wherein:
- the generated recommendation comprises a recommended trigger for the macro;
- the received user indication comprises an indication to accept the recommended trigger; and
- storing the macro comprises storing the macro in association with the recommended trigger.

18. The method of claim 15, wherein the generated recommendation comprises a recommended trigger generated based on at least one of an action of the action sequence or a trigger associated with a macro of another user.

19. The method of claim 15, wherein the trigger comprises at least one of voice input, user interface input, or text input.

20. The method of claim 15, wherein the received user indication comprises at least one of:
- an edit to the action sequence;
- an edit to a recommended trigger; or
- a user-specified trigger.

* * * * *